US009369616B2

(12) United States Patent
Wierikx et al.

(10) Patent No.: US 9,369,616 B2
(45) Date of Patent: Jun. 14, 2016

(54) CAMERA WITH INTERNAL ASSEMBLY FRAME AND PROCESS FOR ASSEMBLING THE CAMERA

(75) Inventors: Ralph Wierikx, Elsloo (NL); Bastiaan Rothengatter, Rotterdam (NL)

(73) Assignee: Robert Bosch GmbH, Stuttgart (DE)

( * ) Notice: Subject to any disclaimer, the term of this patent is extended or adjusted under 35 U.S.C. 154(b) by 166 days.

(21) Appl. No.: 14/235,949

(22) PCT Filed: Jul. 29, 2011

(86) PCT No.: PCT/EP2011/063152
§ 371 (c)(1),
(2), (4) Date: May 23, 2014

(87) PCT Pub. No.: WO2013/017150
PCT Pub. Date: Feb. 7, 2013

(65) Prior Publication Data
US 2014/0253795 A1 Sep. 11, 2014

(51) Int. Cl.
*H04N 5/225* (2006.01)
*G03B 19/00* (2006.01)
*G03B 17/02* (2006.01)

(52) U.S. Cl.
CPC .............. *H04N 5/2252* (2013.01); *G03B 17/02* (2013.01); *G03B 19/00* (2013.01)

(58) Field of Classification Search
CPC .................................................... H04N 5/2232
USPC .......................................................... 348/373
See application file for complete search history.

(56) References Cited

U.S. PATENT DOCUMENTS

| 4,855,838 A | 8/1989 | Jones et al. |
| 6,812,970 B1 | 11/2004 | McBride et al. |
| 2006/0115265 A1* | 6/2006 | Elberbaum ............ F16M 11/18 396/427 |
| 2007/0253702 A1 | 11/2007 | Leyden et al. |

FOREIGN PATENT DOCUMENTS

| DE | 102007001649 | 7/2008 |
| EP | 0285922 | 10/1988 |
| JP | 2003274229 | 9/2003 |
| JP | 2004295119 | 10/2004 |

OTHER PUBLICATIONS

International Search Report for Application No. PCT/EP2011/063152 dated Sep. 22, 2011 (3 pages).

* cited by examiner

*Primary Examiner* — Twyler Haskins
*Assistant Examiner* — Fayez Bhuiyan
(74) *Attorney, Agent, or Firm* — Michael Best & Friedrich LLP

(57) ABSTRACT

Surveillance cameras are for example used in surveillance networks for observing areas of public places, schools, universities, private households, prisons etc. Usually such a surveillance networks comprises a plurality of cameras and a surveillance control center, whereby the cameras are connected by public or private network with the surveillance control center, so that images, captured y the cameras can be transferred to the surveillance control center. A camera (1) comprising a motorized object lens adjusting module (3) for adjusting the object lens or parts thereof, an image processing module (4) for processing the images captured by the camera (1), an interface module (5) for providing Signal interfaces and an external housing enclosing the modules (3, 4, 5), is disclosed, with an internal assembly frame (8) for holding the said modules (3,4,5) as a unit (8) independently from the external housing.

18 Claims, 4 Drawing Sheets

CAMERA WITH INTERNAL ASSEMBLY FRAME AND PROCESS FOR ASSEMBLING THE CAMERA

BACKGROUND OF THE INVENTION

The invention relates to a camera, especially a surveillance camera and a process for assembling the camera. More specifically, the invention relates to a camera comprising a motorized object lens adjusting module for adjusting the object lens or parts thereof, an image processing module for processing the images captures by the camera, an interface module for providing signal interfaces and an external housing enclosing the modules and to a process for assembling the camera.

Surveillance cameras are for example used in surveillance networks for observing areas of public places, schools, universities, private households, prisons etc. Usually such a surveillance network comprises a plurality of cameras and a surveillance control center, whereby the cameras are connected with the surveillance control center by public or private network, so that images, captured by the cameras can be transferred to the surveillance control center.

A respective camera system or surveillance network is for example disclosed in the document DE 10 2007 001 649 A1.

SUMMARY OF THE INVENTION

According to the invention, a camera, especially embodied as a surveillance camera is disclosed.

The camera may form a part of a surveillance network, which comprises a plurality of such cameras and optionally a surveillance control center being connected with the cameras by a private or public network for data exchange.

The camera comprises a motorized object lens adjusting module, which is adapted to alter or adjust the distance of one or more lenses of the camera relative to an image capturing unit, for example a CCD- or CMOS-chip. It is preferred that the motorized object lens adjusting module is embodied as a motorized back focus module. In this embodiment, the motorized object lens adjusting module is adapted to modify or change the distance between the last optical element, especially lens, of the object lens and the image capturing unit in order to adjust the back focus. Such an back focus adjustment improves the quality of the captured images.

Furthermore, the camera comprises an image processing module for preprocessing or processing the image data captured by the image capturing unit. The image capturing unit may be an integral part of the motorized object lens adjusting module or of the image processing module. Optionally, the image processing unit comprises a power stack for providing the camera with power, thus forming a image processing and power module. Preferably, the image processing module is realized as one or more circuit boards carrying electronic components.

An interface module of the camera provides an electrical or electronic interface of the camera. The interface module may for example comprise a network interface or a power interface.

The camera comprises an external housing, which encloses the said three modules and provides an outer face of the camera. The external housing may have recesses for example allowing to access a mechanical interface of the motorized object lens adjusting module for attaching the object lenses or to access the interfaces of the interface module.

According to the invention, the camera comprises an internal assembly frame for holding the said modules as a unit. The said modules are attached to the internal assembly frame in a manner, so that the unit is self-holding independently from the external housing. Especially, the three modules are fixed to the internal assembly frame, aligned and connected to each other without the external housing.

It is one finding of the invention that using an internal assembly frame simplifies the assembly of the camera. The internal assembly frame is able to accommodate all modules during the assembly without any disturbing influence of the external housing. Consequently, the accessibility to the modules during the assembly is improved. A further positive effect is that the external frame can be mounted to the camera in one of the last assembly steps, so that it is quite unlikely that the usually scratch sensitive outside of the external housing is damaged. As the outside of the external housing is visible to the costumer, no damages or scratches are acceptable. Furthermore it is possible to test the unit before any parts of the external housing are assembled so that a repair of the unit is simplified.

In a preferred embodiment of the invention, the internal assembly frame comprises holding means for securing cables connecting the modules to the internal assembly frame. The holding means may for example be realized as snaps or hooks for positive-locking of the cables. In a possible development of the invention, the internal assembly frame comprises cable position indicators indicating the position and the identity of the cables. Both measures further simplify the assembly as one the one hand side, the cable have a fixed position predefined by the holding means and on the other hand assembly errors are diminished because the position of the cables are indicated by the position indicators.

In a further preferred embodiment of the invention, the internal assembly frame comprises a first, a second and a third receptacle for accommodating the motorized object lens adjusting module, the image processing module and the interface module, respectively. The first receptacle is in a front position, the second in a middle position and the third in a back position, whereby the three positions are preferably arranged one after another along an arrangement direction.

In a preferred development of the invention at least one, two or all three modules are fixed in the three receptacles screwless or without the use of screws. It is especially preferred that at least one, two or all modules are secured by positive contact or locking, for example by quick-acting fastener. This embodiment or development has the advantage that the modules can be placed in or for example clicked to the internal assembly frame without using screws so that the assembly is further simplified.

In a possible practical realization of the invention, the internal assembly frame comprises a box-shaped section, which embodies the second receptacle. The box-shaped section allows that the image processing module can be inserted, especially can be slit in an inserting direction, which is preferably perpendicular to the arrangement direction. In a preferred embodiment, the box-shaped section comprises a bottom plate area, a top plate area, a front plate area and a back plate area, which are arranged to form the box-shape, whereby the inserting direction is parallel to the four plate areas.

In preferred development of the invention, the internal assembly frame comprises spring means preferably acting in a direction perpendicular to the top and bottom plate areas. The spring means have the function to compensate clearance tolerances in said direction between the box-shaped section and the image processing module. Optionally, the box-shaped section comprises fixing means for positive locking the image processing module in the inserting direction.

In a further embodiment of the invention, the internal assembly frame comprises a bracket section comprising two brackets, which define the first receptacle. Preferably, the two brackets extend from the front plate area. The motorized object lens adjusting module is arranged between and held by the two brackets.

Optionally, the bracket section comprises snap means for fixing the motorized object lens adjusting module allowing a positive-locking of the motorized object lens adjusting module. The snap means are preferably integrally formed with the brackets. The mounting direction of the motorized object lens adjusting module into the bracket section is parallel to the arrangement direction.

In another aspect of the invention, the internal assembly frame comprises a clamp section with one or more clamps, which defines the third receptacle for the interface module. The clamps preferably extend from the back plate area parallel to the arrangement direction. The clamp section allows a positive-locking of the interface module. In a possible embodiment, the clamps comprise hooks for securing and positive-locking the interface module to the internal assembly frame. The mounting direction for the interface module is identical to the mounting direction of the motorized object lens adjusting module but in the opposite direction.

Summarized, in a preferred embodiment, each module can be placed into or clicked to the internal assembly frame especially without using screws, the cables are also guided and fixed to the internal assembly frame.

In a preferred embodiment of the invention, the internal assembly frame comprises or consists of a top and bottom part, which are snapped or sticks together. Especially, the connection of the two parts are realized by connections which are integrally formed in the two part. The two parts are preferably made of plastic or synthetic and may be realized as injection molded components. This embodiment allows an easy assembly of the internal assembly frame by low cost components. Furthermore it is possible to integrate the frame sided parts of the connections means, of the spring means, of the snap means and of the hooks into the top and bottom part, so that the two parts form a multifunctional mounting basis for the modules.

Another subject-matter of the invention relates to process for assembling the camera as described above. In a first step, the modules are fixed to the internal assembly frame, especially without using tools, to form the unit. In a next step, the functionality, especially the electronic functionality of the unit is tested as the unit is already working. In a last step, the external housing is mounted on the unit. The advantage is, that the internal assembly frame holds all modules for guiding during final assembly. Optionally all cables are guided and fixed to the frame. When all modules are fixed to the internal assembly frame and connected, the unit is working and can be tested before any housing parts are assembled.

BRIEF DESCRIPTION OF THE DRAWINGS

Further features, advantages and effects of the invention will become apparent clear by the description of a preferred embodiment of the invention and the figures as attached. The figures show.

DETAILED DESCRIPTION

Figure 1:
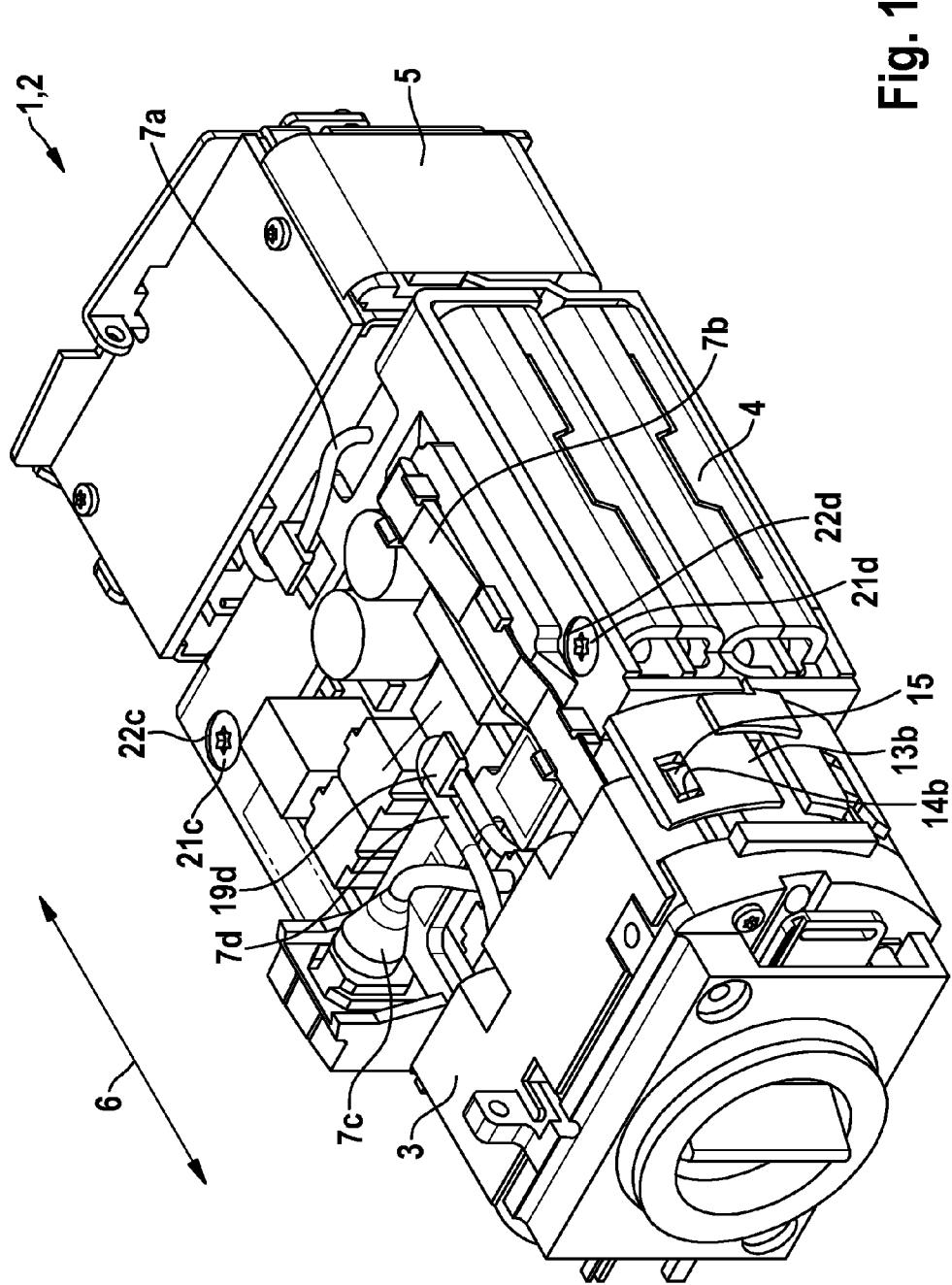
FIG. 1 a three-dimensional isometric view from bottom side on an unit of a camera as an embodiment of the invention.
Figure 2:
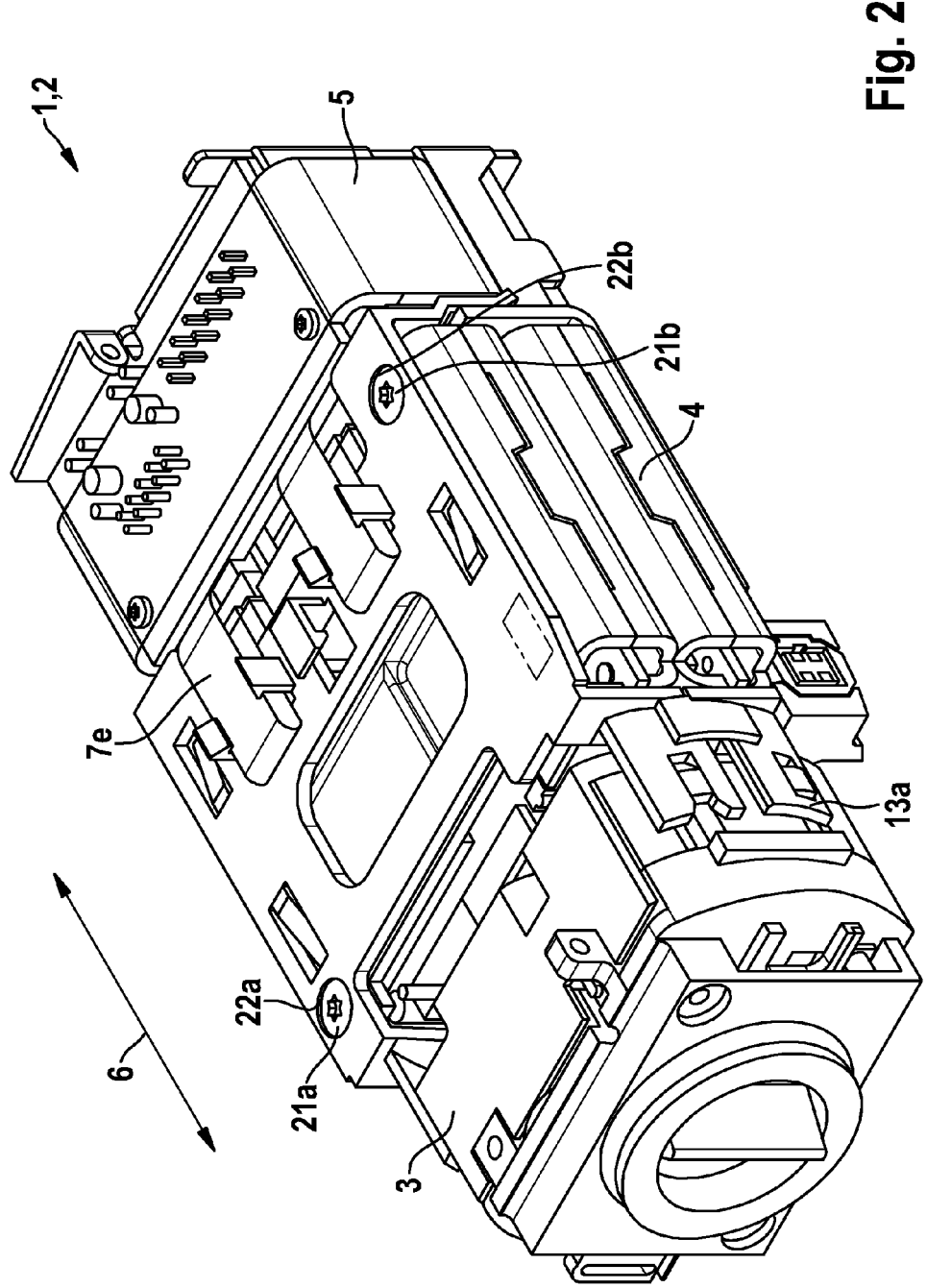
FIG. 2 a three-dimensional isometric view from top side on the unit of FIG. 1.

FIGS. 1 and 2 represent a three-dimensional view of a camera 1 as an embodiment of the invention without an external housing and without object lens, so that only a unit 2 of the camera 1 is shown. The camera 1 and thus the unit 2 is a surveillance camera, for example used in a surveillance network.

The unit 2 is fully functional, so that for example images may be captured and transferred. The unit 2 may roughly be divided into three sub-assemblies, namely a motorized object lens adjusting module 3 for adjusting the object lens or parts thereof, an image processing and power module 4 and an interface module 5. The three modules 3, 4, 5 are arranged linear along an alignment direction 6.

The motorized object lens adjusting module 3 is block-shaped and has the function to adjust the back focus of the camera by changing the distance between the object lens (not shown) and the image capturing unit (not shown).

In the image processing and power module 4, the images captured by the image capturing unit are pre-processed, processed, compressed etc. It is also possible that the images are analyzed or object detection or object tracking is performed. The images may be realized as single images, series of images or video streams with a plurality of images. The image processing and power module 4 comprises one or two printed circuit boards.

The image processing and power module 4 furthermore provides the power for the camera 1 by converting or processing a supply voltage. The interface module 5 provides a plurality of electric/electronic interfaces for example for the power supply for providing the supply voltage, a network interface for example for communicating with a surveillance control center and for transferring images or metadata of the images to the surveillance control center. The modules 3, 4, 5 are connected among themselves with cables 7 a, b, c, d, e. Cable 7a connects the power stack of the image processing and power module 4 with the interface module 5. Cable 7b connects the motorized object lens adjusting module 3 with the power stack of the image processing and power module 4. Cable 7c connects the power stack of the image processing and power module 4 with a DC iris output for lens. Cable 7d connects the motorized object lens adjusting module 3 with the image section of the image processing and power module 4. Cable 7e connects the image section of the image processing and power module 4 with the interface module 5.

The unit 2 as shown in the FIGS. 1 and 2 is the result from a final assembly line, whereby all sub-assemblies and parts are mounted, whereby the unit 2 is self-retaining. Only in a very last step, the external housing and the object lens are mounted. As a consequence, the unit 2 can be tested, repaired etc in the final assembly line prior being enclosed by the external housing, which has the advantage that the accessibility is good and that the external housing is preserved from damages. The external housing covers the unit 2 circumferentially, whereby the two front sides of the motorized object lens adjusting module 3 and the interface module 5 remain uncovered.

Figure 3:
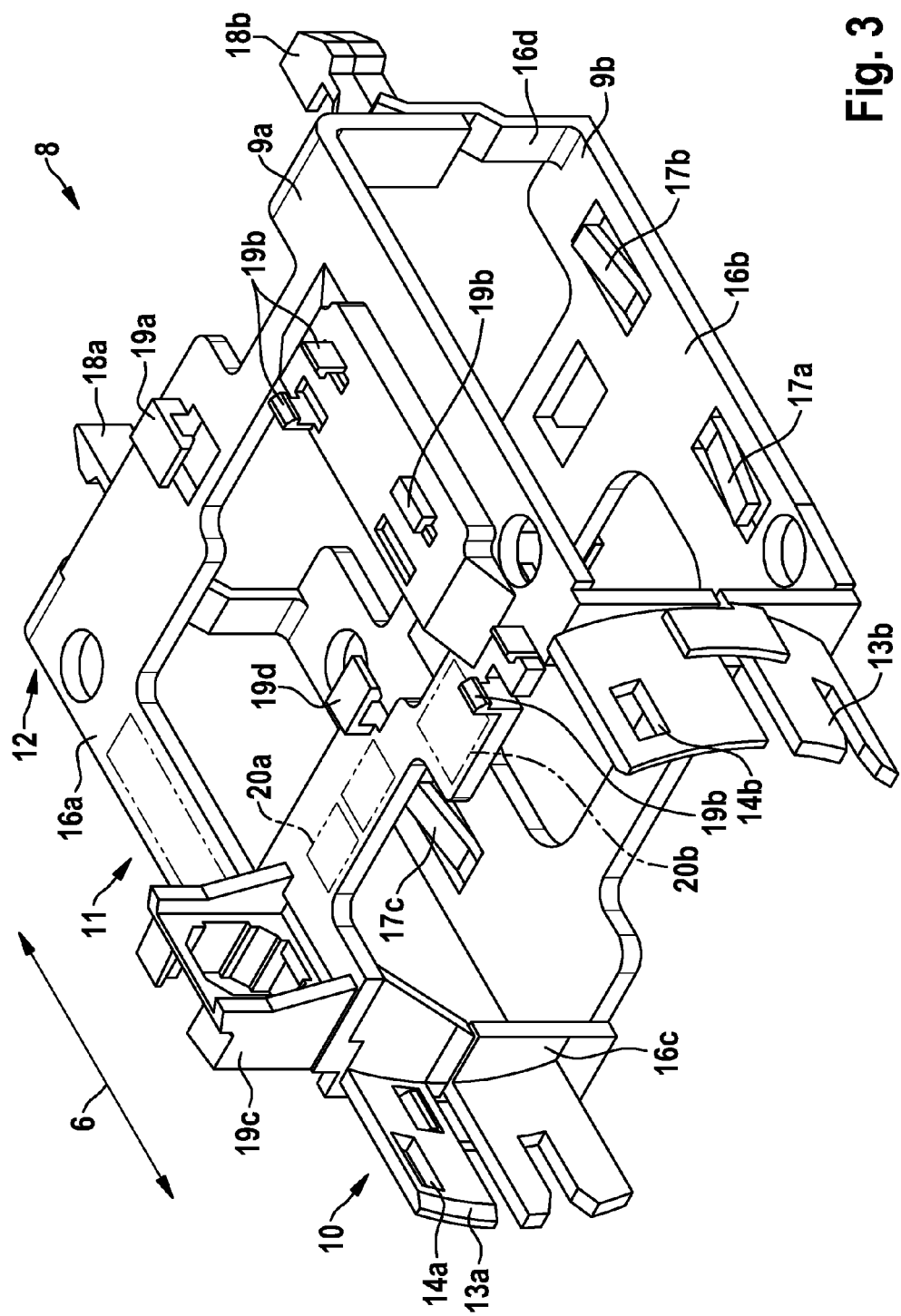
FIG. 3 a three-dimensional isometric view from bottom side on an internal assembly frame of the unit of the previous figures.
Figure 4:
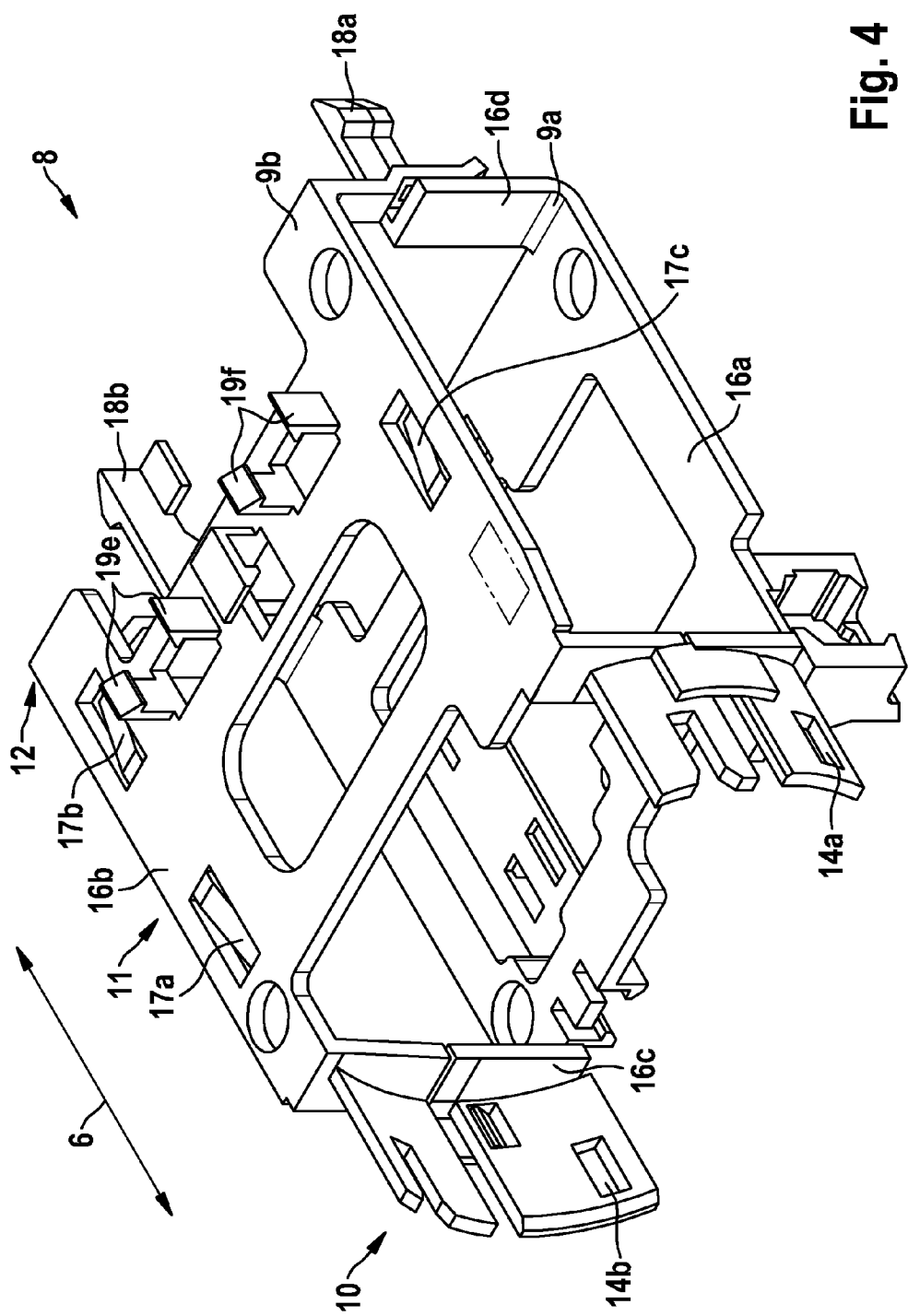
FIG. 4 a three-dimensional isometric view from top side on the internal assembly frame of FIG. 3.

The structural basis of the unit 2 is an internal assembly frame 8, which is shown in the FIGS. 3 and 4, whereby the FIG. 3 shows a three-dimensional isometric view from the bottom and the FIG. 4 from the top. The internal assembly frame 8 is made of plastic and comprises a bottom part 9 a and a top part 9 *b*, whereby each part 9 *a* and 9 *b* represent a half of the internal assembly frame 8.

The internal assembly frame 8 defines a first receptacle 10 for accommodating the motorized object lens adjusting module 3, a second receptacle 11 for accommodating the image processing unit 4 and a third receptacle 12 for accommodating the interface module 5. The three receptacles 10, 11, 12 are also arranged in a line along the alignment direction 6.

The first receptacle 10 is realized as a bracket section with two brackets 13 *a, b*, which enclose the motorized object lens adjusting module 3 from two sides as it be can be seen in the FIGS. 1 and 2. The brackets 13 *a, b* extend parallel to the alignment direction 6, whereby the motorized object lens adjusting module 3 is mounted in a mounting direction parallel to the alignment direction 6.

The brackets 13 *a, b* provide a snap recess 14 *a, b* for receiving a hook section 15 from the motorized object lens adjusting module 3. The brackets 13 *a, b* are flexible in a direction perpendicular to the alignment direction 6, so that the brackets 13 *a, b* can be deflected resiliently increasing the distance between the brackets 13 *a, b* and allowing the mounting of the motorized object lens adjusting module 3. In the final position of motorized object lens adjusting module 3, the brackets 13 *a, b* are snapping back and snap recesses 14 *a, b* and hook sections 15 realize a positive-locking of the motorized object lens adjusting module 3 in the first receptacle 10 against the mounting direction.

The second receptacle 11 is realized as a box-shaped section with a bottom plate area 16 *a*, a top plate area 16 *b*, a front plate area 16 *c* and a back plate area 16 *d*, whereby top and bottom plate areas 16 *a, b* are parallel to each other and front and back plate areas 16 *c, d* are parallel or substantially parallel to each other. Together the plate areas 16 *a, b, c, d* form a channel for receiving the image processing and power module 4. During assembly, the image processing and power module 4 is placed between the not yet assembled top part 9*b* and bottom part 9*a*. In a next step, the top part 9*b* and the bottom part 9*a* are clicked together thereby enclosing the image processing and power module 4 like a bracket. Screws 21 *a, b, c, d* of the image processing and power module 4 and extending thereof are positively locked in corresponding openings 22 *a, b, c, d* in the bottom and top part 9 *a, b*.

For compensating clearance tolerances or an undersize of the image processing module 4 compared to the second receptacle, the top plate area 16*b* provides springs 17*a, b, c*, realized as flexible tongues, which can be deflected in a direction perpendicular to the top plate area 16*b*.

In an alternative assembly method, the image processing and power module 4 can be inserted or slit in along an inserting direction, which is perpendicular to the alignment direction 6 and perpendicular parallel to the bottom and top plate area 16 *a, b*. Optionally the springs may be received by recesses in the image processing module 4 to allow a positive-locking of the image processing module 4 in the second receptacle 11.

The third receptacle 12 is a clamp section with two clamps 18 *a, b*, which extend in the alignment direction and which are introduced into recesses of the interface module 5. At the free end of the clamps 18 *a, b* noses are formed, which cooperate with the recesses in the interface module 5 to allow a snap on of the interface module 5 on the clamps 18 *a, b* and thus again a positive-locking of the interface module 5 on the internal assembly frame 8. The clamps 18 *a, b* are flexible in a direction perpendicular to the alignment direction 6, so that the clamps 18 *a, b* can be deflected resiliently increasing the distance between the clamps 18 *a, b* and allowing the mounting of the interface module 5.

Summarized, all three modules 3, 4, 5 can be attached to the internal assembly frame without the help of tools, as these sub-assemblies may be clicked or snapped on the internal assembly frame 8.

As it can be seen from FIG. 3, hooks, adapters or snaps 19 *a, b, c, d, e, f* are provided for securing the cables 7 *a, b, c, d, e*. Furthermore cable indicators 20 *a, b* are formed into the bottom plate area 16*a* to indicate the correct identity and position of the cables 7 *b, c* during assembly.

The bottom part 9 *a* and the top part 9 *b* of the internal assembly frame 8 are divided by a parting plane, which extends parallel to the top and bottom plate area 16 *a, b*. The front and back plate area 16 *c, d* are formed by sections of the bottom part 9 *a* and the top part 9 *b*, which are snapped together and are secured to each other by positive-locking. As molded part, the bottom part 9*a* comprises integrally the bottom plate area 16 *a*, a lower section of the brackets 13 *a, b*, hooks, adapters or snaps 19 *a, b, c, d* and a lower section of the front and back plate area 16 *c, d*. The molded top part 9*b* comprises integrally the top plate area 16 *a*, an upper section of the brackets 13 *a, b*, hooks, adapters or snaps 19 *e, f*, the clamps 18 *a, b*, the springs 17 *a, b, c* and a lower section of the front and back plate area 16 *c, d*.

During assembly of the camera 1, the unit 2 is guided through the assembly line with exception of the outer housing parts, whereby the internal assembly frame 8 holds all modules 3, 4, 5 and all cables 7*a, b, c, d, e* are fixed to the internal assembly frame 8. The advantages are especially the ease of assembly, limited number of assembly jigs, less screws and less/no damage of the outer housing parts. When all parts are assembled, to the internal assembly frame 8, the unit 2 is working and can be tested before any housing part are assembled.

What is claimed is:

1. A camera (1) comprising
    a motorized object lens adjusting module (3) for adjusting an object lens or parts thereof,
    an image processing module (4) for processing images captured by the camera (1),
    an interface module (5) for providing signal interfaces, and
    an external housing enclosing the motorized object lens adjusting, image processing and interface modules (3, 4, 5), and
    an internal assembly frame (8) for holding the said modules (3,4,5) as a unit (8) independently from the external housing, the internal frame assembly (8) having a first receptacle (10) for the motorized object lens adjusting module (3) in a front position, a second receptacle (11) for the image processing module (4) in a middle position, a third receptacle (12) for the interface module (5) in a back position, and a box-shaped section defining the second receptacle (11), wherein the image processing module (4) is inserted in the box-shaped section.

2. The camera (1) according to claim 1, characterized in that the internal assembly frame (8) comprises holding means (19 *a, b, c, d, e, f*) for cables (7*a, b, c, d, e*) connecting the modules (3, 4, 5).

3. The camera (1) according to claim 1, characterized in that the internal assembly frame comprises cable position indicators (20 *a, b*).

4. The camera (1) according to claim 1, characterized in that the internal assembly frame (8) comprises spring means (17 *a, b, c*) for compensating clearances or clearance tolerances between the image processing module (4) and the internal assembly frame (8).

5. The camera (1) according to claim 1, characterized in that the internal assembly frame (8) comprises a bracket section comprising two brackets (13 *a, b*) defining the first receptacle (10), whereby the motorized object lens adjusting module (3) is placed between the brackets (13 *a, b*).

6. The camera (1) according to claim 5, characterized in that the internal assembly frames (8) comprises snap means (14 *a, b*, 15) for securing and positive-locking the motorized object lens adjusting module (3) in the bracket section.

7. The camera (1) according to claim 1, characterized in that the internal assembly frame (8) comprises a clamp section comprising two clamps (18 *a, b*) defining the third receptacle (12), whereby the two clamps (18 *a, b*) are inserted into the interface module (5).

8. The camera (1) according to claim 7, characterized in that the clamps (18 *a, b*) comprise hooks or noses for securing and positive-locking the interface module (5) to the internal assembly frame (8).

9. The camera (1) according to claim 1, characterized in that the internal assembly frame (8) comprises a bottom part (9 *a*) and a top part (9 *b*), which are stick or snapped together to form the internal assembly frame (8).

10. A process for assembling the camera (1) according to claim 1, characterized in that the modules (3, 4, 5) are mounted to or with the internal assembly frame (8) to form the unit (2), testing the functionality of the unit (2), and mounting the external housing after testing the functionality of the unit (2).

11. The camera (1) according to claim 1, characterized in that the internal assembly frame (8) comprises spring means (17 *a, b, c*) for compensating clearances or clearance tolerances between the image processing module (4) and the internal assembly frame (8) and for locking the image processing module (4).

12. The camera (1) according to claim 1, wherein the internal assembly frame (8) defines an arrangement direction (6), and wherein the first receptacle (10), the second receptacle (11), and the third receptacle (12) are arranged one after another along the arrangement direction.

13. The camera (1) according to claim 12, wherein the second receptacle (11) is arranged between the first receptacle (10) and the third receptacle (12).

14. The camera (1) according to claim 13, wherein the internal assembly frame (8) is configured to hold said modules (3, 4, 5) without the external housing such that said modules (3, 4, 5) are arranged one after another along the arrangement direction when held in the internal frame assembly (8) and are connected to each other when held in the internal frame assembly (8).

15. The camera (1) according to claim 1, wherein the internal assembly frame (8) is configured to hold said modules (3, 4, 5) without the external housing.

16. The camera (1) according to claim 15, wherein the internal assembly frame (8) is configured to hold said modules (3, 4, 5) without the external housing such that said modules (3, 4, 5) are connected to each other.

17. The camera (1) according to claim 1, wherein the internal assembly frame (8) is configured to hold said modules (3, 4, 5) without the use of screws.

18. The camera (1) according to claim 1, wherein said modules (3, 4, 5) are configured to snap fit into the internal assembly frame (8).

\* \* \* \* \*